(12) United States Patent
Tanaka

(10) Patent No.: US 7,134,277 B2
(45) Date of Patent: Nov. 14, 2006

(54) DRIVING FORCE DISTRIBUTION APPARATUS FOR RIGHT AND LEFT WHEELS

(75) Inventor: Takashi Tanaka, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 64 days.

(21) Appl. No.: 11/088,799

(22) Filed: Mar. 25, 2005

(65) Prior Publication Data

US 2005/0210873 A1    Sep. 29, 2005

(30) Foreign Application Priority Data

Mar. 29, 2004   (JP)   ............... 2004-096185

(51) Int. Cl.
*F16D 31/02* (2006.01)
*F16H 48/20* (2006.01)

(52) U.S. Cl. .............. 60/445; 60/487; 60/489; 475/84

(58) Field of Classification Search ............ 60/487, 60/465, 443, 472, 445, 489; 475/72, 83, 475/84

See application file for complete search history.

(56) References Cited

U.S. PATENT DOCUMENTS

| | | | | |
|---|---|---|---|---|
| 1,935,105 A | * | 11/1933 | Woollen | 175/26 |
| 5,232,410 A | * | 8/1993 | Yanai | 91/449 |
| 6,328,667 B1 | * | 12/2001 | Otaki et al. | 475/84 |
| 6,860,105 B1 | * | 3/2005 | Yano et al. | 60/487 |

FOREIGN PATENT DOCUMENTS

JP    2003-130175    5/2003

* cited by examiner

*Primary Examiner*—Igor Kershteyn
(74) *Attorney, Agent, or Firm*—Smith, Gambrell & Russell, LLP

(57) ABSTRACT

A hydraulic pump of a driving force distribution apparatus for right and left axles includes a pump shaft, a swash plate supported tiltably, swash plate tilting and holding mechanism unit for tilting and holding the swash plate to one side or to the other side depending on the direction of rotation of the pump shaft, and a hydraulic oil supply mechanism unit having a cylinder block. The cylinder block holds pistons which reciprocate inside cylinder holes while making contact with a tilt surface of the swash plate at their extremities. When the pump shaft rotates in a forward or reverse direction, the pistons reciprocate to supply hydraulic oil sucked from a tank to a suction port of an operation control valve. Thus, the driving force distribution apparatus can apply relative rotating forces to right and left axles even during backward running, with no increase in the size of the apparatus.

2 Claims, 6 Drawing Sheets

DRIVING FORCE DISTRIBUTION APPARATUS FOR RIGHT AND LEFT WHEELS

BACKGROUND OF THE INVENTION

The present invention relates to a driving force distribution apparatus for distributing driving forces to be transmitted to right and left wheels.

The present application claims priority from Japanese Patent Application No. 2004-096185, the disclosure of which is incorporated herein by reference.

Among such driving force distribution apparatuses is one comprising a differential case, a differential unit, a hydraulic motor, and a hydraulic pump (see Japanese Patent Application Laid-Open No. 2003-130175). Here, a rotational driving force of a propeller shaft which is rotatably supported and connected to an engine side thereof is transmitted to the differential case through gears. The differential unit distributes and transmits an input driving force to the differential case to right and left axles by using a planetary gear mechanism. The hydraulic motor gives relative rotating forces to the right and left axles. The hydraulic pump drives the hydraulic motor for a rotation.

As shown in FIG. 6 (sectional view), the hydraulic pump 100 provided in the driving force distribution apparatus is of radial plunger type, including a cylinder block 101 and a cam ring 103. The cylinder block 101 retains a plurality of plungers 102 radially so as to be able to reciprocate. The cam ring 103 is arranged around a periphery of the cylinder block 101. The cylinder block 101 is formed integrally with a pump shaft 104. A gear 105 formed on the periphery of the differential case 10 transmits the driving force to a drive gear formed on the pump shaft 104 of the hydraulic pump 100 via an idle gear 106 for the rotation. Consequently, when the pump shaft 104 rotates, the cylinder block 101 rotates to reciprocate the plungers 102, thereby operating the hydraulic pump 100 for pumping.

A one-way clutch 107 is arranged between the pump shaft 104 and the drive gear 105. The one-way clutch 107 operates the hydraulic pump 100 only when the vehicle is running forward, and stops the pumping operation of the hydraulic pump 100 when the vehicle is running backward. Since the power is transmitted thereto from the propeller shaft 5 through the differential case 10, the hydraulic pump 100 is driven to rotate not only when the vehicle is running forward but also when running backward. The direction of rotation of the hydraulic pump 100 in the forward running is opposite from in the backward running. This reverses a suction oil channel and a discharge oil channel connected to the hydraulic pump 100 in usage. Since the hydraulic oil is sucked through the discharge oil channel which is designed for higher pressures and has a smaller cross section, a cavitation can occur at the side of the suction oil channel which has a larger cross section. Oil leakage can also occur. The one-way clutch 107 mentioned above is thus provided in order that the hydraulic pump 100 shall make its pumping operation only in the forward running.

As above, the hydraulic pump provided in the conventional driving force distribution apparatus for right and left axles is stopped when the vehicle runs backward. During the backward running, what are transmitted to the right and left wheels are evenly distributed driving forces alone. It is therefore impossible to apply relative rotating forces to the right and left axles.

Then, the one-way clutch may be eliminated while cross sectional area is increased in the oil channel leading to the suction side of the hydraulic pump rotating in the reverse direction when the vehicle runs backward. This can produce the problem, however, that the driving force distribution apparatus for right and left the axles is increased in complexity and in size, making it difficult to mount the driving force distribution apparatus on the vehicle.

SUMMARY OF THE INVENTION

The present invention has been achieved in view of the foregoing problems. It is thus an object of the present invention to provide a driving force distribution apparatus capable of applying relative rotating forces to right and left axles even when a vehicle is running backward, without increasing a size of the entire apparatus.

The present invention provides the driving force distribution apparatus for transmitting a driving force transmitted from an engine to a hydraulic pump of a hydraulic mechanism through a transmission mechanism, the apparatus comprising: a differential unit having a planetary gear mechanism for distributing and transmitting the driving force transmitted from the engine to the right and left axles; a hydraulic motor for applying relative rotating forces to the right and left axles; and the hydraulic mechanism for controlling supply and exhaust of hydraulic oil discharged from the hydraulic pump to the hydraulic motor by using an operation control valve, thereby driving the hydraulic motor for rotation. The hydraulic pump includes: a rotatably-supported pump shaft for rotating by a power from a transmission mechanism; a swash plate supported so as to be capable of tilting to one side and to the other side freely; swash plate tilting and holding means (for example, a swash plate tilting mechanism unit 70 in an embodiment to be described later) for tilting and holding the swash plate to the one side when the pump shaft rotates in a forward direction, and tilting and holding the swash plate to the other side when the pump shaft rotates in a reverse direction; and hydraulic oil supply means (for example, a hydraulic oil supply mechanism unit 80 in the embodiment) having a cylinder unit (for example, a cylinder block 81 in the embodiment) for holding a plurality of pistons in its cylinder holes so as to be capable of reciprocating, the pistons being biased toward a tilt surface of the swash plate so that the respective edges come into contact with the same. When the pump shaft rotates in the forward direction or in the reverse direction, the hydraulic oil supply means causes a relative rotation between the swash plate and the cylinder unit to make the pistons reciprocate inside the cylinders via the tilt surface. As a result, the hydraulic oil sucked from a tank is discharged to a channel (for example, a first channel 97 in the embodiment) leading to a predetermined suction port of the operation control valve.

According to the present invention, the swash plate is supported so as to be able to tilt to one side and the other side freely. When the shaft rotates in the forward direction or in the reverse direction, the swash plate and the cylinder unit make relative rotations so that the pistons are reciprocated inside the cylinder holes via the tilt surface. This makes the hydraulic oil sucked from the tank flow into the channel which leads to the predetermined suction port of the operation control valve. Consequently, the hydraulic pump sucks the hydraulic oil from an oil channel, and flows the hydraulic oil into the pump oil channel leading to the suction port of the operation control valve irrespective of the direction of the rotation of the pump shaft. Suppose here that the oil channel for supplying the hydraulic oil from the operation control valve to the hydraulic motor is designed for higher pressures, and the oil channel for establishing connection between the tank and the hydraulic pump is designed for lower pressures. Even in this case, the hydraulic oil sucked from the tank flows through the pump oil channel and the operation control valve into the high-pressure oil channel for pressurization, which prevents cavitation from occurring in the oil channel leading to the hydraulic motor. This can avoid the situation where the hydraulic oil leaks from the oil channel or the like due to the occurrence of the cavitation. Moreover, even when the vehicle runs backward, the hydraulic oil can be supplied to the hydraulic motor without causing the cavitation. It is therefore possible to apply relative rotating forces to the right and left axles with stability while the vehicle is running backward.

In the driving force distribution apparatus of the present invention, the swash plate tilting means comprises: a fixed unit formed on the pump shaft; a moving unit arranged so as to be able to approach and retreat from the fixed unit; a cam mechanism unit arranged between the fixed unit and the moving unit, for allowing the moving unit to move freely with respect to the fixed unit and thereby letting the swash plate tilt to the one side when the pump shaft rotates in the forward direction, and moving the moving unit away from the fixed unit and thereby pushing the swash plate to tilt to the other side when the pump shaft rotates in the reverse direction; and a bias unit for biasing the swash plate to tilt to the one side when the pump shaft rotates in the forward direction. The forward rotation of the pump shaft allows the moving unit to move freely, thereby letting the swash plate tilt to the one side. The bias unit biases the swash plate to tilt to the one side. When the pump shaft rotates in the reverse direction, the cam mechanism unit moves the moving unit with respect to the fixed unit, thereby tilting the swash plate to the other side. Consequently, the swash plate can be surely tilted to the one side and to the other side without detecting the direction of the rotation of the pump shaft.

According to the distribution apparatus of the present invention, it is possible to apply relative rotating forces to the left and right axles even when the vehicle runs backward, without increasing the size of the entire apparatus.

BRIEF DESCRIPTION OF THE DRAWINGS

These and other objects and advantages of the present invention will become understood from the following description with reference to the accompanying drawings, wherein.

DETAILED DESCRIPTION OF THE PREFERRED EMBODIMENTS

Hereinafter, a preferred embodiment of a driving force distribution apparatus for right and left axles according to the present invention will be described with reference to FIGS. 1 to 5. The present embodiment will be explained by an example of the driving force distribution apparatus which is connected to the axles of a pair of rear wheels arranged on both right and left sides of a vehicle such as an automobile.

Figure 1:
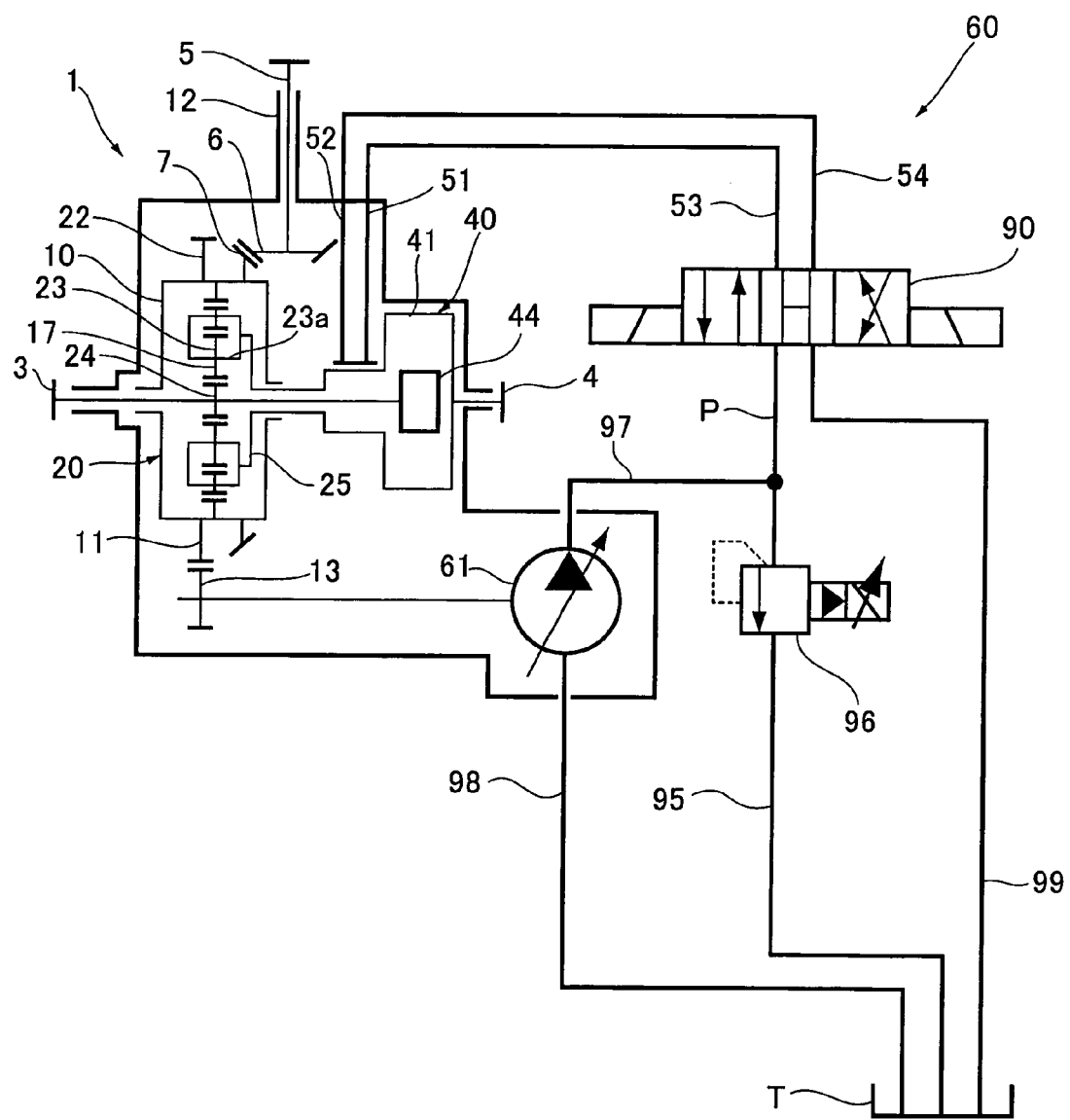
FIG. 1 is a schematic diagram showing a driving force distribution apparatus for right and left axles according to an embodiment of the present invention.

As shown in FIG. 1 (sectional view), the driving force distribution apparatus 1 comprises a differential unit 20, a hydraulic motor 40, and a hydraulic mechanism 60. The differential unit 20 includes a planetary gear mechanism for distributing and transmitting a driving force transmitted from an engine to left and right axles 3 and 4. The hydraulic motor 40 applies relative rotating forces to the left and right axles 3 and 4. The hydraulic mechanism 60 controls a supply and exhaust of hydraulic oil discharged from a hydraulic pump 61 to the hydraulic motor 40 by using an operational control valve 90, thereby driving the hydraulic motor 40 for rotating.

The differential unit 20 distributes and transmits the driving force of the engine, which is inputted to a rotatably-supported differential case 10 for making rotations under the driving force, to the left and right axles 3 and 4. The differential case 10 is rotatably supported by a housing 17 which is fixed to a vehicle body, and rotates under power transmitted thereto from a drive shaft 5 connected to the engine through a drive pinion 6 and a gear 7.

The differential unit 20 is of a so-called planetary gear type. The rotational force transmitted to the differential case 10 is distributed evenly to the left and right axles 3 and 4 by a plurality of planetary gears 23 and a sun gear 24 via a ring gear 22 which is rotatably supported in the differential case 10. The rotations of the planetary gears 23 about their own axes absorb a difference in the rotation between the left and right axles 3 and 4. The planetary gears 23 are rotatably supported via spindles 23a by planetary carriers 25 which are arranged on both sides. The sun gear 24 in mesh with the planetary gears 23 is connected to the left axle 3. The planetary carriers 25 are connected to the right axle 4 through a case 41 of the hydraulic motor 40 described later.

The hydraulic motor 40 is arranged axially on the right of the differential unit 20 which is arranged in the housing 17. The hydraulic motor 40 is of a radial plunger type, and is connected to the control valve 90 through communication oil channels described later. The hydraulic motor 40 has a cylinder block 44 and a cam ring 48. For example, the cylinder block 44 has a plurality of radially extending cylinder holes 45 in which respective plungers are loaded so as to be capable of reciprocating. The cam ring 48 is arranged so that it surrounds the cylinder block 44 and makes contact with end surfaces of the plungers. The cylinder block 44 is coupled to the right end of the axle 3 which extends laterally. The cam ring 48 is fixed to the case 41 mentioned above. The cylinder block 44 and the case 41 are supported via a bearing or the like so as to be able to relatively rotate.

The case 41 is connected at one end to the planetary carriers 25. Consequently, an outer ring of the hydraulic motor 40, composed of the cam ring 48 and the case 41, makes to integrally rotate with the differential case 10.

The plungers loaded in the cylinder holes 45 are constantly biased toward the cam ring by such means as springs. The plurality of cylinder holes 45 have an internal oil channel formed in the respective bottoms thereof. One of the ends of each internal oil channel opens to the bottom of the cylinder hole while the other extends toward a differential mechanism and opens to a periphery. The oil channels arranged in the circumferential direction are grouped alternately. When one of the groups is supplied with the hydraulic oil, the other group exhausts the hydraulic oil. Incidentally, the oil channels in one of the groups will be referred to as first supply and exhaust oil channels 51, and those in the other group as second supply and exhaust oil channels 52. The first supply and exhaust oil channels 51 are connected to the operation control valve 90 through a first communication oil channel 53. The second supply and exhaust oil channels 52 are connected to the operation control valve 90 through a second communication oil channel 54. The inner periphery of the cam ring 48 is shaped so that the plungers give continuous rotational movements to the cam ring when the hydraulic oil is supplied to and exhausted from one and the other of the groups of internal oil channels alternately.

The hydraulic oil mechanism 60 comprises the operation control valve 90 and the hydraulic pump 61. The operation control valve 90 is connected to the hydraulic motor 40 through the first communication oil channel 53 and the second communication oil channel 54. The hydraulic pump 61 supplies the hydraulic oil to the control valve 90. The hydraulic pump 61 is of an axial swash plate type, and is configured so that the power transmitted to the differential case 10 through the drive shaft 5, the drive pinion 6, and the gear 7 is transmitted thereto through a transmission mechanism connected to the differential case 10 for rotating. The transmission mechanism is formed by meshing a gear 11 formed on the differential case 10 with an intermediate gear 13 so that the power is transmitted to the hydraulic pump 61 through the intermediate gear 13.

Figure 2:
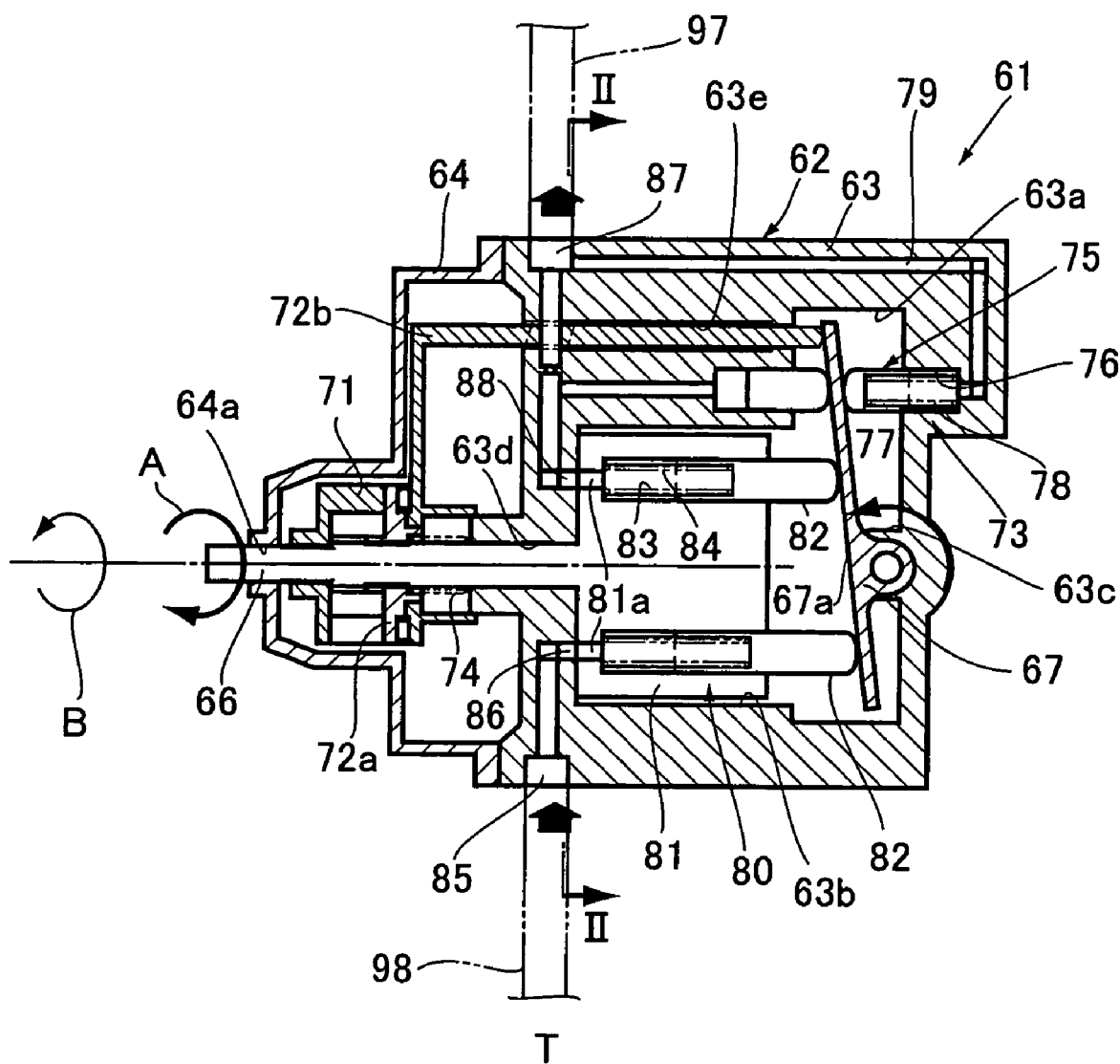
FIG. 2 is a sectional view of a hydraulic pump provided in the distribution apparatus.

As shown in FIG. 2 (sectional view), the hydraulic pump 61 comprises a pump shaft 66, a swash plate 67, a swash plate tilting and holding mechanism unit 70, and a hydraulic oil supply mechanism unit 80. The pump shaft 66 is rotatably supported inside a pump casing 62, and makes to rotate under the power from the transmission mechanism. The swash plate 67 is supported inside the pump casing 62 so as to be able to tilt toward the pump shaft 66 (to the left) and away from the pump shaft 66 (to the right). The swash plate tilting mechanism 70 tilts and holds the swash plate 67 to the left when the pump shaft 66 rotates in the forward direction (in the direction of an arrow A). The swash plate tilting mechanism unit 70 tilts and holds the swash plate 67 to the right when the pump shaft 66 rotates in the reverse direction (in the direction of an arrow B). The mechanism unit 80 has a cylinder block 81 which retains a plurality of pistons 82 in its cylinder holes 83 so as to be able to reciprocate. The pistons 82 are biased toward a tilt surface 67a of the swash plate 67 so that the end surfaces contact with the same. When the pump shaft 66 rotates in the forward direction or in the reverse direction, the cylinder block 81 is rotated to make the pistons 82 to reciprocate inside the cylinder holes 83 via the tilt surface 67a. As a result, the hydraulic oil sucked in from a tank T is discharged to a first pump oil channel 97 which leads to a predetermined suction port of the control valve. Incidentally, the pump shaft 66 is connected via the transmission mechanism so that the shaft 66 rotates in the direction of the arrow A when the vehicle is running forward, and the shaft 66 rotates in the direction of the arrow B when the vehicle is running backward.

The pump casing 62 has a body unit 63 and a lid unit 64 which is detachably attached to the left end of the body unit 63. A first hole part 63a for accommodating (or holding) the swash plate 67 tiltably is formed in the body unit 63. A second hole portion 63b for accommodating the cylinder block 81 rotatably is formed in the left of and in communication with the first hole portion 63a. The swash plate 67 is swingably and pivotally jointed at its right end to a protrusion 63c which is formed on the inner side of the first hole portion 63a. The swash plate 67 can swing in the lateral directions freely around the position of pivotal joint with the protrusion 63c. The cylinder block 81 has a columnar shape. The pump shaft 66 extending to the left is formed integrally on the left end of the cylinder block 81. The pump shaft 66 is rotatably supported in a body hole portion 63d which is formed in the left end of the body unit 63 and a lid hole portion 64a which is formed in the lid unit 64. Consequently, when the pump shaft 66 rotates, the cylinder block 81 also rotates with the pump shaft 66.

Figure 3:
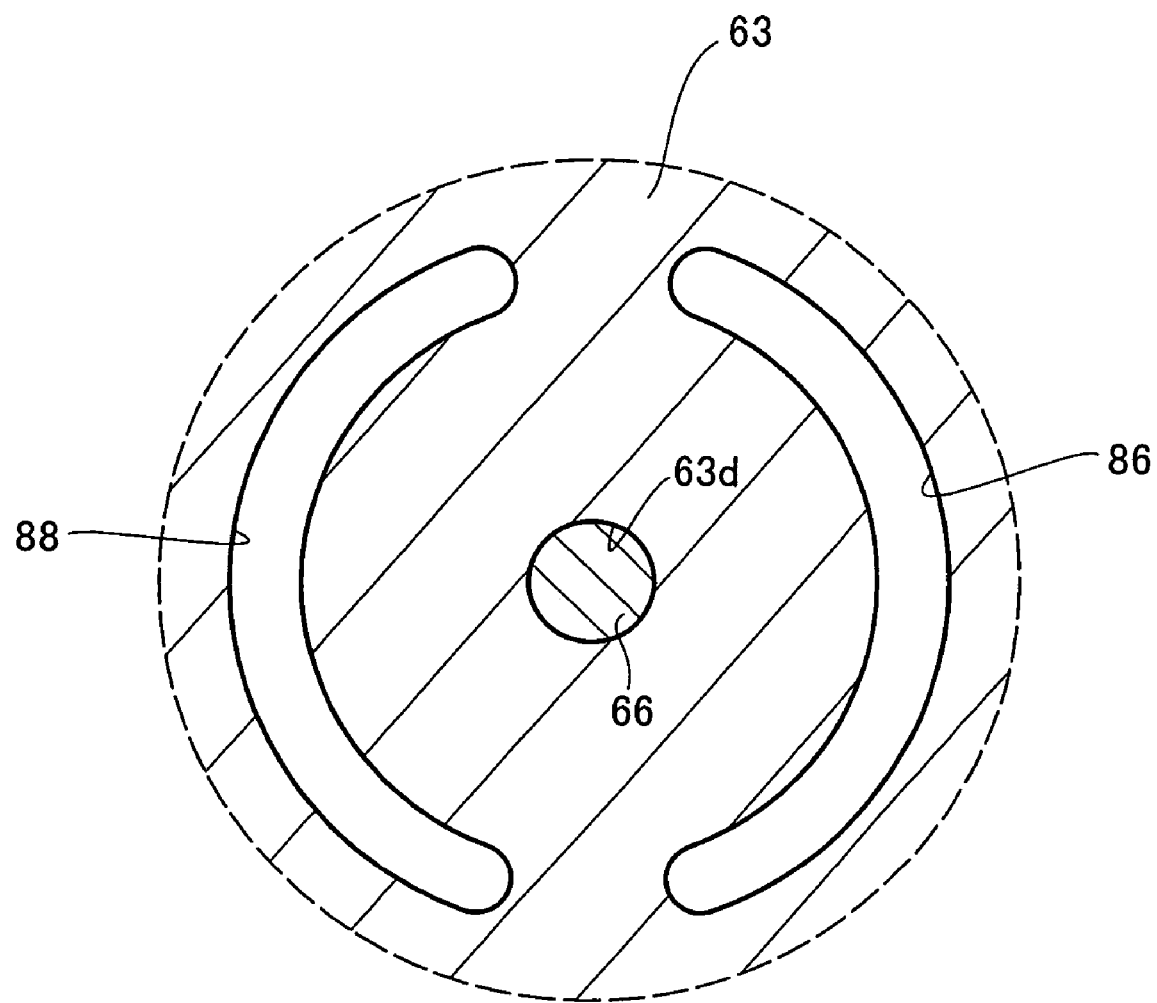
FIG. 3 is a partial sectional view of the portion taken along the line II—II of FIG. 2.

The plurality of cylinder holes 83 formed in the cylinder block 81 extend in the axial direction of the cylinder block 81. The pistons 82 are loaded into the respective cylinder holes 83 so that the pistons 82 can reciprocate inside the cylinder holes 83. The pistons 82 are biased by springs 84 loaded in the cylinder holes 83 so that the end surfaces always make contact with the tilt surface 67a of the swash plate 67. Internal oil channels 81a are formed in the bottoms of the respective cylinder holes 83. Each of the oil channels 81a opens at one end to the bottom of the cylinder hole, and at the other end to the left side of the cylinder block 81. A suction oil channel 86 and an exhaust oil channel 88 are formed in the end of the body unit 63 on the left of the second hole part 63b. The suction oil channel 86 communicates with a suction port 85 which opens to the outer periphery of the body unit 63. The exhaust channel 88 communicates with an exhaust port 87 which opens to the outer periphery of the body unit 63. As shown in FIG. 3 (sectional diagram) the suction channel 86 and the exhaust channel 88 are formed in an arc shape on both sides across the body hole part 63d. Incidentally, FIG. 3 is a sectional view of the portion taken along the line II—II of FIG. 2. Returning to FIG. 2, the suction port 85 is in communication with the end of the suction channel 86, and the exhaust port 87 is in communication with the end of the exhaust channel 88. A second channel 98 communicating with the tank T is connected to the suction port 85. The first pump channel 97 mentioned above is connected to the exhaust port 87.

Figure 4A:
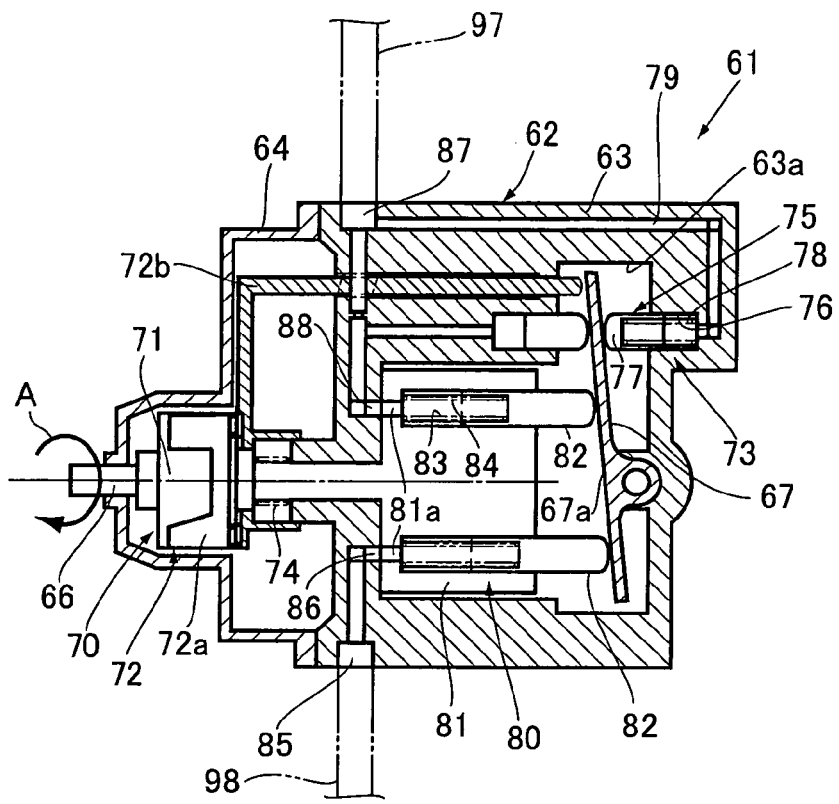
FIGS. 4A and 4B are sectional views of the hydraulic pump for explaining the states of the hydraulic pump in operation, FIG. 4A showing an operational state of the hydraulic pump when the pump shaft is rotating in a forward direction, FIG. 4B showing the operational state when the pump shaft is rotating in a reverse direction.

Now, referring to FIG. 4A (sectional view), suppose that the pump shaft 66 rotates in the direction of the arrow A with the swash plate 67 tilted to the left. Here, the cylinder block 81 also rotates in the direction of the arrow A, and the pistons 82 make reciprocations while rotating along the tilt surface 67a of the swash plate 67. Consequently, the pistons 82 falling on the side of the suction channel 86 in FIG. 3 come into a suction stroke, and the hydraulic oil is sucked into the cylinder holes 83 through the suction port 85, the suction channel 86, and the internal channels 81a. Then, the pistons 82 falling on the side of the exhaust channel 88 in FIG. 3 come into an exhaust stroke, and the hydraulic oil is discharged from the cylinder holes 83 to the first pump channel 97 through the internal channels 81a, the exhaust channel 88, and the exhaust port 87.

Figure 4B:
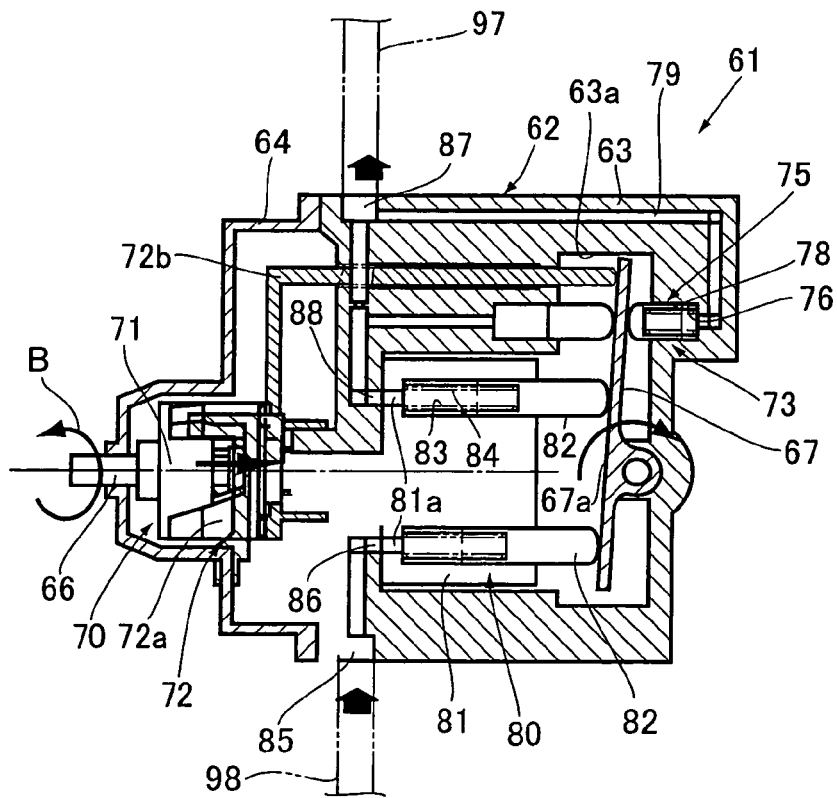

Now, suppose that the pump shaft 66 rotates in the direction of the arrow B with the swash plate 67 tilted to the right as shown in FIG. 4B (sectional view). Here, the cylinder block 81 also rotates in the direction of the arrow B, and the pistons 82 make the reciprocations while rotating along the tilt surface 67a of the swash plate 67. Consequently, the pistons 82 falling on the side of the suction channel 86 in FIG. 3 come into the suction stroke, and the hydraulic oil is sucked into the cylinder holes 83 through the suction port 85, the suction oil channel 86, and the internal channels 81a. Then, the pistons 82 falling on the side of the exhaust channel 88 in FIG. 3 come into the exhaust stroke, and the hydraulic oil is discharged from the cylinder holes 83 to the first pump channel 97 through the internal channels 81a, the exhaust channel 88, and the exhaust port 87. That is, when the pump shaft 66 switches to rotate from the forward direction to the reverse direction, the hydraulic oil in the tank T can be sucked in from the suction port 85 and discharged to the first pump channel 97 as in the forward direction if the swash plate 67 is tilted to the right. Incidentally, the hydraulic oil supply mechanism unit 80 is composed of the cylinder block 81 having the plurality of the pistons 82, the internal oil channels 81a communicating with the cylinder holes 83 in which the pistons 82 are loaded, and the suction channel 86 and the exhaust channel 88.

As shown in FIG. 2, the swash plate tilting mechanism unit 70 for tilting the swash plate 67 comprises a fixed unit 71, a moving unit 72, a cam mechanism unit, and a bias unit 73. The fixed unit 71 is connected to the pump shaft 66 in the lid unit 64. The moving unit 72 is arranged so that it can approach and retreat from the fixed unit 71 in the axial direction of the pump shaft 66. The cam mechanism unit is arranged between the fixed unit 71 and the moving unit 72. When the pump shaft 62 rotates in the forward direction, the cam mechanism unit allows the moving unit 72 to move freely with respect to the fixed unit 71, thereby letting the swash plate 67 tilt to the left. When the pump shaft 66 rotates in the reverse direction, the cam mechanism unit moves the moving unit 72 away from the fixed unit 71 (to the right), thereby pushing the swash plate 67 to tilt to the right. The bias unit 73 biases the swash plate 67 to tilt to the left when the pump shaft 66 rotates in the forward direction.

The moving unit 72 is made of a fitting part 72a and a thrust member 72b. The fitting part 72a fits to the pump shaft 66 slidably. The thrust member 72b is connected to the fitting part 72a, and extends toward the swash plate 67. The fitting part 72a is always biased toward the fixed unit 71 by a spring 74 which is attached onto the pump shaft 66 between the fitting part 72a and the body unit 63. The operation of the spring 74 will be described later. The extremity of the thrust member 72b is movably inserted into an insertion hole 63e which is formed in the body unit 63 and communicates with the first hole part 63a so that the thrust member 72b protrudes into the first hole part 63a. The end surface of the thrust member 72b is located at a position opposite to the end of the tilt surface 67a of the swash plate 67. The cam mechanism unit is made of a cam groove which is formed in the fixed unit 71, and an engaging part which is formed on the moving unit 72 and makes an engagement with the cam groove. In the cam mechanism unit, when the pump shaft 66 rotates in the reverse direction, the cam groove rotates in the reverse direction and the engaging part moves along the cam groove. That is, the moving unit 72 moves away from the fixed unit 71. As the result, the thrust member 72b of the moving unit 72 moves toward the swash plate 67. The end surface thus contacts with and pushes the tilt surface 67a of the swash plate 67, thereby tilting the swash plate 67 to the right. The cam groove is also provided with a return groove which can restore the position of the engaging part toward the fixed unit 71 when the pump shaft 66 rotates in the forward direction. Incidentally, when the engaging part comes into engagement with the return groove, the moving unit 72 stops moving. This makes the moving unit 72 free with respect to the fixed unit 71, so that the moving unit 72 is returned toward the fixed unit 71 by the spring 74 mentioned above.

As the result, the swash plate 67 tilted to the right cannot be tilted to the left unless there is some means for biasing the swash plate 67 toward the pump shaft 66. The bias unit 73 is thus provided for the swash plate tilting mechanism unit 70. The bias unit 73 comprises a thrust cylinder 75 which is arranged in the first hole part 63a, opposite to the thrust member 72b with the swash plate 67 therebetween. The thrust cylinder 75 protrudes and retracts by the action of the hydraulic pressure from the hydraulic oil that flows toward the exhaust port 87. The thrust cylinder 75 comprises a piston 77, a spring 78, and a communication oil channel 79. The piston 77 is loaded into a cylinder hole 76 formed in the body unit 63, so as to be able to protrude and retract. The spring 78 is loaded in the cylinder hole 76, and biases the piston 77 toward the swash plate 67. The communication channel 79 establishes the communication between the exhaust port 87 and the cylinder hole 76.

As shown in FIG. 1, the operation control valve 90 of the hydraulic mechanism 60 is an electromagnetic two-position-and-four-port selector valve type. A suction port P to be supplied with the hydraulic oil is connected with the first pump channel 97. When the control valve 90 is in a neutral state, the control valve 90 connects the first supply channel 51 and the second supply channel 52 to a tank oil channel 99 through the first communication channel 53 and the second communication channel 54. The tank channel 99 leads to the tank T. When the control valve 90 is switched to one side, it establishes the communication between the first supply channel 51 and the first pump channel 97 through the first communication channel 53, and between the second supply channel 52 and the tank channel 99 through the second communication channel 54. When the control valve 90 is switched to the other side, it establishes the communication between the second supply channel 52 and the first pump channel 97 through the second communication channel 54, and between the first supply channel 51 and the tank channel 99 through the first communication channel 53. Here, the control valve 90 is controlled by a not-shown controller. Incidentally, a relief oil channel 95 is connected between the first pump channel 97 and the tank channel 99. A relief valve 96 is formed on the relief channel 95.

Next, the operation of the driving force distribution apparatus 1 according to the present invention will be described for situations where the vehicle runs forward and where it runs backward. Initially, the description will be given of the case where the vehicle runs forward. When the control valve 90 is in its neutral state, the cylinder block 44 of the hydraulic motor 40 is in a free state since the pair of the supply channels 51 and 52 communicate with the tank T. Consequently, the driving force from the engine is transmitted to the drive shaft 5, and equal driving forces are transmitted to the left and right axles 3 and 4 through the differential unit 20.

Figure 5:
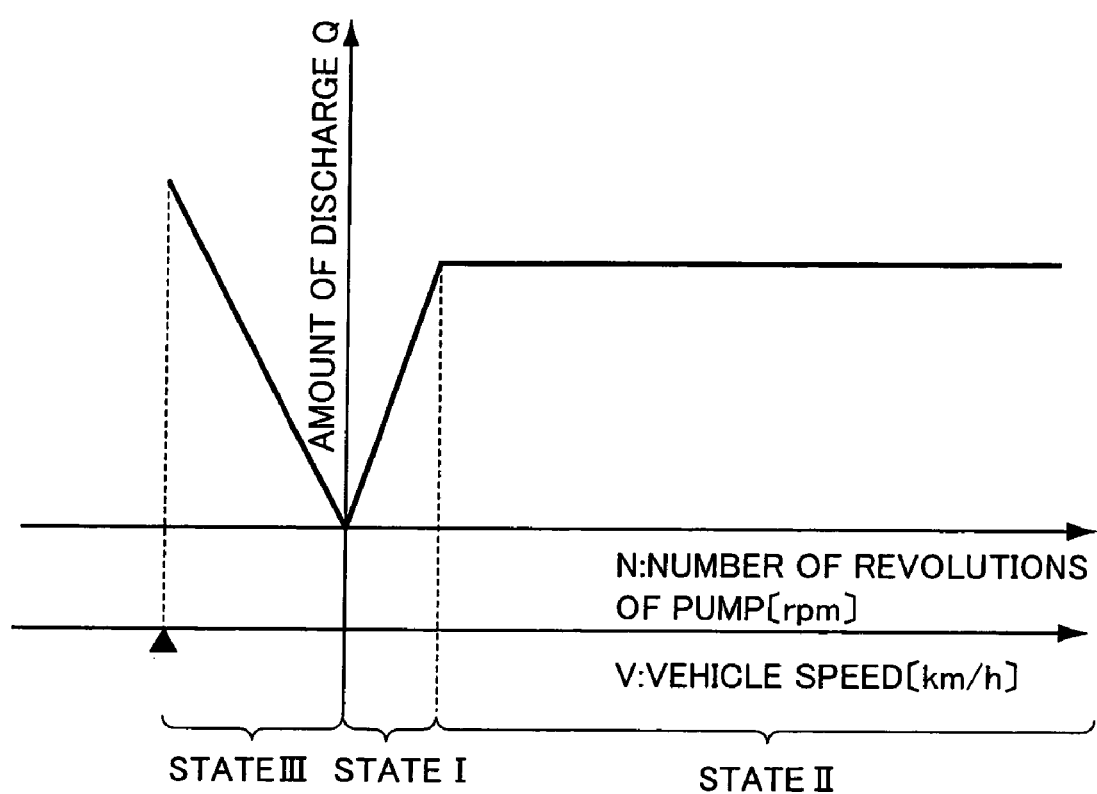
FIG. 5 is a characteristics chart of the hydraulic pump, showing relationships between a number of revolution of the pump (vehicle speed) and a discharged amount of the hydraulic oil.
Figure 6:
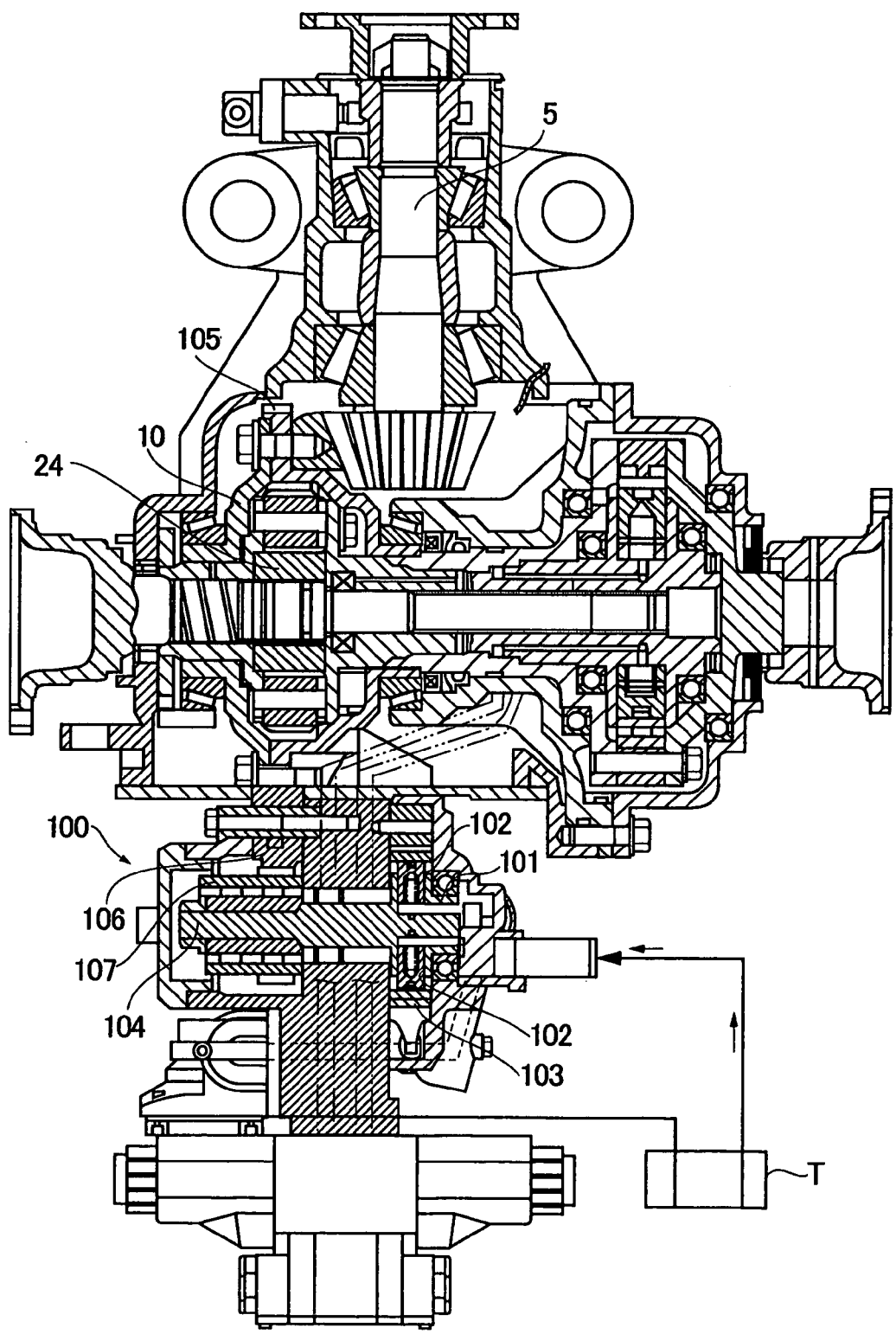
FIG. 6 is the sectional view of a conventional driving force distribution apparatus for right and left axles.

For example, when the control valve 90 in this state is switched to the one side by the controller, the first supply channel 51 and the first pump channel 97 communicate with each other and the second supply channel 52 and the tank channel 99 communicate with each other. In the hydraulic pump 61, as shown in FIG. 4A, the pump shaft 66 rotates in the forward direction (in the direction of the arrow A) and the cylinder block 81 also rotates in the direction of the arrow A. Then, the pistons 82 reciprocate while rotating along the tilt surface 67a of the swash plate 67 which is tilted to the left. The operation on the tilt direction of the swash plate 67 will be described later. Among the pistons 82, ones falling on the side of the suction channel 86 suck the hydraulic oil into the cylinder holes 83 through the suction port 85, the suction channel 86, and so on. The pistons 82 falling on the side of the exhaust channel 88 discharge the hydraulic oil to the first pump channel 97 through the internal channels 81a, the exhaust channel 88, and the exhaust port 87. Consequently, the hydraulic oil discharged from the hydraulic pump 61 flows into the first pump channel 97, and is supplied to the hydraulic motor 40 through the first communication channel 53 shown in FIG. 1. The hydraulic oil exhausted from the hydraulic motor 40 can be returned to the tank T through the second communication channel 54 and the operation control valve 90, thereby applying relative rotating forces to between the left and right axles 3 and 4. Incidentally, as shown in FIG. 5, the amount of the discharged hydraulic oil from the hydraulic pump 61 increases with an increasing vehicle speed (state I), and reaches a constant rate when the vehicle speed exceeds a predetermined value (state II).

Returning now to FIG. 4A, when the pump shaft 66 is rotating in the forward direction, the moving unit 72 is free from the fixed unit 71 as described above. The moving unit 72 thus approaches the fixed unit 71 since it is biased toward the fixed unit 71 by the spring 74. Moreover, the piston 77 of the bias unit 73 is biased by the spring 78 to protrude out of the cylinder hole 76. This tilts the swash plate 67 to the left. Note that when the pump shaft 66 rotates in the forward direction with the swash plate 67 tilted to the left, the hydraulic oil flows in a discharging direction from the exhaust port 87. Thus, the hydraulic oil further biases the piston 77 toward the swash plate 67 through the communication channel 79 which communicates with the exhaust port 87. Consequently, the swash plate 67 is held tilted to the left stably by the biasing force of the spring 78 and the biasing force from the hydraulic pressure.

On the other hand, when the vehicle runs backward, it starts to move from a resting state. As shown in FIG. 4B, this creates the state that no hydraulic oil flows inside the hydraulic pump 61 before a backward movement of the vehicle. This inactivates the hydraulic pressure of the hydraulic oil for biasing the piston 77 of the bias unit 73 to protrude. When the pump shaft 66 in this state rotates in the reverse direction, the moving unit 72 moves toward the swash plate 67. The thrust plate 72b protrudes into the first hole part 63a, thereby biasing the swash plate 67 to the right. Here, the piston 77 for biasing the swash plate 67 to the left undergoes only the biasing force of the spring 78 which is weak. The thrust member 72b can thus tilt the swash plate 67 to the right against the biasing force of the spring 78.

As the result, when the pump shaft 66 rotates in the reverse direction (in the direction of the arrow B), the cylinder block 81 also rotates in the direction of the arrow B. Among the pistons 82, ones falling on the side of the suction channel 86 suck the hydraulic oil into the cylinder holes 83 through the suction port 85. The pistons 82 falling on the side of the exhaust channel 88 discharge the hydraulic oil from the cylinder holes 83 to the first pump channel 97 through the exhaust port 87. Consequently, as shown in FIG. 1, the hydraulic oil sucked in from the hydraulic pump 61 flows through the first pump channel 97, and is supplied to the hydraulic motor 40 through the control valve 90. The hydraulic oil exhausted from the hydraulic motor 40 is returned to the tank T through the control valve 90. Relative rotating forces can thus be applied to between the left and right axles 3 and 4. As shown in FIG. 5, the amount of the discharged hydraulic oil from the hydraulic pump 61 increases with increasing vehicle speed (state III).

The hydraulic oil discharged from the hydraulic pump 61 is supplied through the control valve 90 to the communication channels 53 and 54 and the supply channels 51 and 52 for a pressurization. This prevents a cavitation from occurring in the oil channels that establish a connection between the control valve 90 and the hydraulic motor 40 (the first communication channel 53, the second communication channel 54, the first supply channel 51, and the second supply channel 52). As the result, it is possible to avoid the situation where the hydraulic oil leaks from these oil channels or the like due to the occurrence of the cavitation. Moreover, even when the hydraulic pump 61 according to the present invention rotates in the reverse direction, both the oil channel (the second pump channel 98) for sucking the hydraulic oil from the tank T and the channel (the first pump channel 97) for supplying the hydraulic oil from the hydraulic pump 61 to the operation control valve 90 are unchanged. The hydraulic oil will thus not be sucked through the supply and exhaust channels 51 and 52 which are designed for higher pressures. This eliminates the need to extend the supply and exhaust channels 51 and 52 and the like, precluding an increase in the size of the driving force distribution apparatus 1. That is, the driving force distribution apparatus 1 according to the present invention can apply relative rotating forces to the left and right axles 3 and 4 even when the vehicle runs backward, without an increase in the size of the apparatus.

The foregoing embodiment relates with the configuration that the cylinder block 81 shown in FIG. 2 rotates together with the pump shaft 66. Nevertheless, the swash plate 67 may be tiltably and rotatably attached to the end surface of the pump shaft 66 while the cylinder block 81 is fixed. Moreover, while the swash plate 67 has been configured so that the spring 78 which is included in the piston 77 biases it via the piston 77 of the bias unit 73, the swash plate 67 may be biased to the left all the time by a torsion coil spring which is arranged on the body unit 63.

While there has been described what are at present considered to be preferred embodiments of the present invention, it will be understood that various modifications may be made thereto, and it is intended that the appended claims cover all such modifications as fall within the true spirit and scope of the present invention.

What is claimed is:

1. A driving force distribution apparatus for transmitting a driving force from an engine to right and left axles, comprising:
   a differential unit for distributing and transmitting the driving force from the engine to the right and left axles;
   a hydraulic motor having a case and a cylinder block, said case connecting with one of the right and left axles, and said cylinder block connecting with the other of the right and left axles for applying relative forces to the right and left axles;
   a hydraulic axial pump having a case, a cylinder block, a swash plate and a swash plate tilting means, said case having two ports, said cylinder block being rotated by a power from the engine and said swash plate being controlled by said swash plate tilting means; and
   a control valve being equipped between said pump and said motor for hydraulically connecting said pump and said motor;
   wherein
   said swash plate tilting means tilts and holds said swash plate to the one side when said cylinder block of said hydraulic pump rotates in a forward direction, and tilts and holds the swash plate to the other side when said cylinder block of said hydraulic pump rotates in a reverse direction so that the one port is always a suction port and the other port is always an exhaust port irrespective of rotating direction.

2. The driving force distribution apparatus according to claim 1, wherein said swash plate tilting means comprises:

a fixed unit formed on a pump shaft connecting with said cylinder block;

a moving unit arranged to capable of approaching and retreating from the fixed unit;

a cam mechanism unit arranged between the fixed unit and the moving unit for allowing the moving unit to move freely with respect to the fixed unit and thereby letting the swash plate tilt to the one side when the pump shaft rotates in the forward direction and moving the moving unit away from the fixed unit and thereby pushing the swash plate to tilt to the other side when the pump shaft rotates in the reverse direction; and a bias unit for biasing the swash plate to tilt to the one side when the pump shaft rotates in the forward direction.

* * * * *